United States Patent [19]

Voelskow

[11] 4,438,851
[45] Mar. 27, 1984

[54] METHOD AND APPARATUS FOR THE SORTING OUT OF PLASTIC FOILS FROM A MIXTURE OF REFUSE

[76] Inventor: Peter Voelskow, Holzinshaus 15, 7869 Schönau/Schw., Fed. Rep. of Germany

[21] Appl. No.: 312,538

[22] Filed: Oct. 19, 1981

[30] Foreign Application Priority Data

Oct. 20, 1980 [DE] Fed. Rep. of Germany ....... 3039547

[51] Int. Cl.³ .............................................. B07C 5/34
[52] U.S. Cl. .................................... 209/616; 209/688; 209/930
[58] Field of Search .............. 209/606, 615, 616, 688, 209/930, 632; 198/692, 693; 493/373

[56] References Cited

U.S. PATENT DOCUMENTS

| | | | |
|---|---|---|---|
| 202,761 | 4/1878 | Shamberfer et al. | 209/688 |
| 790,171 | 5/1905 | Bechtel | 209/688 |
| 2,778,286 | 1/1957 | Walker | 493/373 |
| 2,888,860 | 6/1959 | Baumgartner | 493/373 |
| 3,024,903 | 3/1962 | Jamal | 209/632 |
| 4,207,986 | 6/1980 | Cerroni | 209/930 X |

FOREIGN PATENT DOCUMENTS 2623067 12/1977 Fed. Rep. of Germany .
2823537 12/1978 Fed. Rep. of Germany .
54-10585 5/1979 Japan .................................. 209/930

*Primary Examiner*—Robert B. Reeves
*Assistant Examiner*—Edward M. Wacyra
*Attorney, Agent, or Firm*—Michael J. Striker

[57] ABSTRACT

Method and apparatus for the sorting out of plastic foil from a mixture of refuse previously divested of heavy materials such as stone, glass and iron. The mixture is conducted in a thin layer, using moderate feeding power, past pointed spines on a reel, by a broom or brush, so that components with high tensile strength remain hanging on the spines, while components with low tensile strength, such as paper, or components not impaled, such as leather, cardboard, wood and thick-walled plastic, are further conveyed by the broom or brush. One or more brush rollers, preferably armed with strips or brushes transverse to the direction of conveying, sweep the mixture of refuse across one or more spiked rollers studded with spines. Combing-off rollers may be used, rotating at higher velocity and in opposite direction to the spiked rollers, to loosen impaled foils from the spines.

5 Claims, 1 Drawing Figure

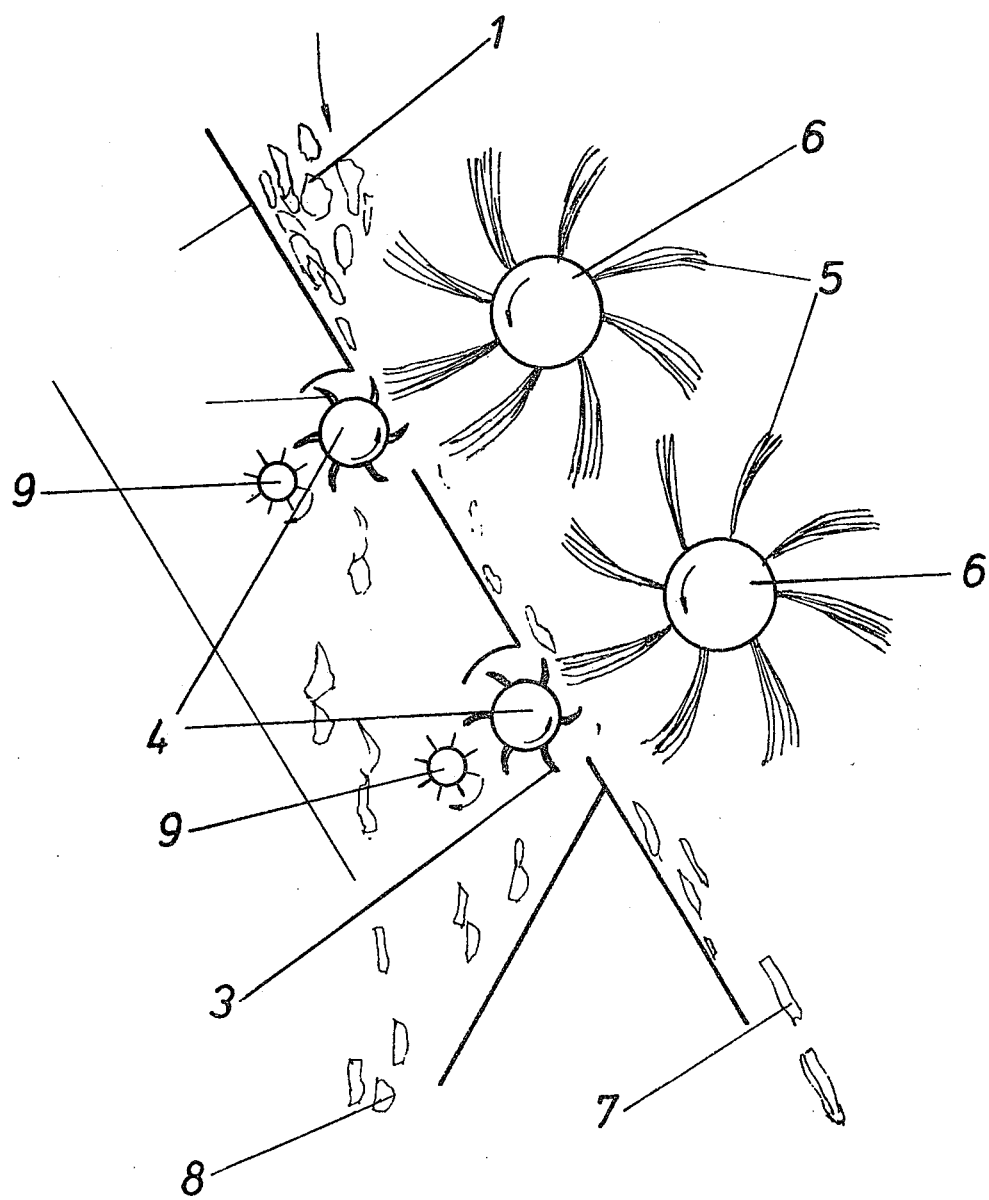

METHOD AND APPARATUS FOR THE SORTING OUT OF PLASTIC FOILS FROM A MIXTURE OF REFUSE

BACKGROUND OF THE INVENTION

The invention concerns a method as well as an apparatus for the sorting out of plastic foils from a mixture of refuse, which previously has been divested of at least its heavy material components such as stone, glass and iron.

The invention originates from German Patent DE-OS 28 23 537. In this publication an arrangement is described for the separation of foil-like plastic materials from paper, with which through utilization of their combined operations, the rotation of a reel and an opposing feed movement of a conveyor loaded predominantly with paper and plastic materials are used for purposes of separation of the material conveyed by the conveyor into two types of material, and specifically into a more flexible type of material and a less flexible type of material, whereby the more flexible plastic materials are picked up by the arms of the reel.

This publication further describes and designates each arm of the reel as hook-like curved pegs.

The operation should obviously proceed such that the nearly spine- or hook-like arms of the reel impale and elevate the plastic foils with a uniform direction of movement across a conveyor loaded with mixture of refuse, while the stiffer, less movable paper remains lying on the conveyor. If possible, the flexible plastic-foils should be picked up and elevated solely through the hook-like arms of the reel, while the stiffer sheets of paper fall down between the arms of the reel and remain on the conveyor.

In the first assumed functional case, when the plastic foils are impaled, it is hardly avoidable that also papers are impaled by means of the pointed hooks or arms, and together with the plastic foils get carried away from the mixture on the conveyor by means of the reel.

In the second assumed case, when only the extreme flexibility of plastic foils or also textile scraps is supposed to be used, in order to fish them out of the mixture of refuse and raise them high, by means of the arms or hooks of the reel, it is likewise very strongly possible, so to speak "shake off" all of the paper, i.e. not to grasp it by means of the hooks or arms of the reel.

This known apparatus can itself, however, at best be adapted for the purpose of carrying away a mixture enriched with plastic foils and textile refuse from the previous mixture on the conveyor.

SUMMARY OF THE INVENTION

The object of the invention is therefore to improve such a mechanical foil-separation arrangement, so that the carried away plastic foils and, if present, textile refuse, are as free as possible from contamination owing to papers and other refuse components.

The invention achieves this object by a method for the sorting out of plastic foils from a mixture of refuse, which previously has been divested of at least its component of heavy material, in which by means of brooms or brushes, using moderate feeding power, the mixture of refuse is, in a thin layer, so led past spines, that only components with higher tensile strength remain hanging on these spines, while components with lower tensile strength such as paper, are torn by the spines and are further conveyed by the brooms or brushes with the components which are not seized by the spines, such as leather, cardboard and wood and which slide away across the spines.

It is likewise known to thereby utilize the different tensile strengths of paper on the one hand and plastic foils on the other hand for the mechanical sorting out of plastic foils, so that a mixture of paper and foils is led past an apparatus studded with spines by means of a carrier gas stream (German Patent DE-OS No. 26 23 067). With this known method the mixture of refuse must, however, first be separated into a light, airworthy material of paper and plastic foils, by means of an air sifter, considerably increasing the costs of the apparatus. Moreover, it requires considerable expenditure to lead the light material mixture of paper and foils past the spines, e.g. a spiked roller, with a carrier gas stream, and besides, blowers with high drive power and connected cyclone separator are necessary for separation of the carrier gas stream from the refuse.

In contrast to this, the method and the apparatus employed for its practice according to the present invention are just as simple and uncomplicated as the originally cited method with simple reels across a conveyor, allowing, however, through utilization of the different tensile strengths of foils and paper, substantially more exact separation of both of these components, just as with the last cited method utilizing a carrier gas stream for the movement of the mixture of refuse.

The novel features which are considered characteristic for the invention are set forth in particular in the appended claims. The invention itself, however, both as to its construction and its method of operation and use, together with additional objects and advantages thereof, will be best understood from the following description of specific embodiments when read in connection with the accompanying drawing.

BRIEF DESCRIPTION OF THE DRAWING

The single FIGURE shows a schematic example for an apparatus according to the present invention, with brush rollers.

DESCRIPTION OF THE PREFERRED EMBODIMENTS

The mixture of refuse 1 arrives by optional mechanical conveying means, for example a conveyor or a shaker loader, at the chute 2, disposed downwardly sloping, which is penetrated by one or more rollers 4 studded with spines 3, transverse to the direction of flow of the downwardly sliding mixture of refuse 1. Parallel to and above the spiked rollers are disposed brush rollers 6 studded with brush bands 5, band-like hair brooms or the like, which convey the mixture of refuse 1 across the spikes 3 of the spiked rollers 4.

The more such roller couplings composed of spiked roller 4 together with brush roller 6 are disposed, the cleaner is the separating effect. At the bottom end of chute 2 the mixture of refuse 7 is composed only of all remaining material without the plastic foils and on occasion textile refuse 8, which are conveyed in another direction.

Combing-off rollers 9, e.g. spiked rollers or brush rollers, can serve unheated with and more quickly rotating than spikes 3, to loosen impaled foils from the spikes 3 of spiked rollers 4. The spikes of these combing-off rollers 9 are formed blunt, and the speed of rotation is so high that all components are hurled off by these blunt spikes.

In place of the brush rollers 6, rotating conveyors can also be used, disposed parallel to chutes 2 and attached with brush bands, band-like brooms or the like transverse to the direction of conveying.

The invention is not limited to this representative example. It can optionally be used with spikes disposed with optional elements, which move contrarotating to the direction of conveying of the arrangement of brooms or brushes.

It will be understood that each of the elements described above, or two or more together, may also find a useful application in other types of separation differing from the types described above.

While the invention has been illustrated and described as embodied in a method and apparatus for the sorting out of plastic foils from a mixture of refuse, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Method for sorting out plastic foil from a mixture of refuse which previously has been divested of at least its components of heavy materials, such as stone, glass and iron, in which the mixture of refuse is conducted past spines of a spiked roller with a direction of movement corresponding so that foil or textile wastes are seized and more rigid components, such as paper, are not seized, characterized in that the mixture of refuse is conveyed in a thin layer using moderate feeding power in opposite direction of movement past said pointed spines by means of a broom or brush so that only components with higher tensile strength remain hanging on the spines while components with lower tensile strength, such as paper, or components which are not seized, such as leather, cardboard, wood boards and thick-walled plastic refuse, are further conveyed by the broom or brush.

2. Apparatus for the practice of the method according to claim 1, characterized in that at least one brush roller is used for conveying the mixture of refuse across at least one said spiked roller.

3. Apparatus for the practice of the method according to claim 1, characterized in that said broom or brush comprises a conveyor armed transverse to the direction of conveying with strips of brushes or lamellar sweeping brushes serves to convey the mixture of refuse across at least one said spiked roller.

4. Apparatus according to claim 2, wherein combing-off rollers are disposed adjacent said at least one said spiked roller, rotating with higher velocity than and opposing the at least one said spiked roller.

5. Apparatus according to claim 2, wherein the at least one spiked roller penetrate a transverse-running aperture of a downwardly sloped chute substantially only with their spines.

* * * * *